United States Patent [19]

Lewiner et al.

[11] Patent Number: 5,751,241
[45] Date of Patent: May 12, 1998

[54] METHOD AND APPARATUS FOR MEASURING THE SPEED OF A MOVING BODY

[76] Inventors: Jacques Lewiner, 7, avenue de Suresnes, 92210 Saint-Cloud; Eric Carreel, 9, rue de Général Gouraud, 92190 Meudon, both of France

[21] Appl. No.: 765,285

[22] PCT Filed: Jun. 30, 1995

[86] PCT No.: PCT/FR95/00879

§ 371 Date: Mar. 10, 1997

§ 102(e) Date: Mar. 10, 1997

[87] PCT Pub. No.: WO96/01435

PCT Pub. Date: Jan. 18, 1996

[30] Foreign Application Priority Data

Jul. 6, 1994 [FR] France ................. 94 08346

[51] Int. Cl.$^6$ ........................................... G01S 13/60
[52] U.S. Cl. .................. 342/104; 342/111; 342/112; 342/115; 342/116; 342/196
[58] Field of Search .................. 342/104, 109, 342/111, 112, 115, 117, 116, 196, 192

[56] References Cited

U.S. PATENT DOCUMENTS 4,302,758 11/1981 Tomasi ..................... 343/9 R

FOREIGN PATENT DOCUMENTS

| 0 534 056 A1 | 5/1992 | European Pat. Off. . |
| 0 534 056 B1 | 3/1993 | European Pat. Off. . |
| 2 443 070 | 6/1980 | France . |

OTHER PUBLICATIONS

French Search Report dated 20 Mar. 1995, French Appl. No. FR9408346

Primary Examiner—John B. Sotomayor
Attorney, Agent, or Firm—Marshall, O'Toole, Gerstein, Murray & Borun

[57] ABSTRACT

To measure the speed of a body (1) moving relative to the ground (2) by means of a broad-band Doppler radar (3) fixed to the moving body, two incident radar waves are transmitted successively towards the ground at instants that are close together, and the corresponding reflected waves are picked up, the frequency of at least the first incident wave being time-varying, the signals representative of the first incident and reflected waves are multiplied together, a spectrum is determined for the low frequency component of the product of said two signals, the same operations are performed for second incident and reflected waves, then two peaks that correspond with a certain amount of frequency shift in the two spectra are identified, and the speed of the moving body is determined as a function of the frequencies of these two singular points and as a function of the height of the radar relative to the ground.

14 Claims, 1 Drawing Sheet

METHOD AND APPARATUS FOR MEASURING THE SPEED OF A MOVING BODY

FIELD OF THE INVENTION

The invention relates to methods for measuring the speed of a moving body, and to apparatuses for implementing said methods.

BACKGROUND OF THE INVENTION

More particularly, the invention relates to a method of measuring the speed v of a body, in particular a vehicle, moving in a direction parallel to the ground, said measurement being performed by means of a Doppler radar having a transmitter/receiver fixed to the moving body at a certain height h above the ground and designed to transmit a radar beam towards the ground along a mean axis extending forwards or backwards relative to the direction of movement, said method including the following steps:

a) at a first instant $t_1$, supplying the radar transmitter/receiver with a first sinusoidal control electrical signal at a first frequency $f_1$ to cause the transmitter/receiver to transmit a first incident radar wave at the same frequency $f_1$;

b) receiving a first reflected radar wave generated by the first incident radar wave being reflected on the ground, and generating from said first reflected radar wave a first received electrical signal;

c) multiplying together the first control electrical signal and the first received electrical signal, thereby generating a first multiplied electrical signal having a high frequency component and a low frequency component;

d) filtering the first multiplied electrical signal to generate a first filtered signal proportional to the low frequency component of the first multiplied signal; and e) during a first measurement time $\Delta t_1$ starting at the first instant $t_1$, determining a first frequency spectrum corresponding to the first filtered signal.

Document EP-A-0 534 056 describes one example of such a method.

That mode of measurement is more accurate than using conventional revolution counters or angle sensors which measure the speed of rotation of the wheels of the vehicle, insofar as variations in wheel diameter and the wheels slipping or skidding on the ground give rise to relatively large errors in speeds measured by means of revolution counters or the like.

In addition, the Doppler effect radar merely needs to be fixed to the structure of the vehicle, and is simpler to install than a revolution counter which implies a mechanism connected to the moving parts of the wheels.

In known methods of the kind in question, the frequency spectrum of the filtered signal has a peak corresponding to a certain frequency, and that frequency can be used to compute the speed of the moving body relative to the ground, given an angle α formed between the travel direction of the moving body and the transmit-and-receive direction of the radar wave relative to the transmitter/receiver.

If the selected angle α is 90°, then the transmitted wave is indeed reflected by the ground, even if the ground presents no particular irregularity, but in this case the frequency shift due to the Doppler effect is nil.

In contrast, if the angle α is small relative to 90°, the frequency shift due to the Doppler effect is large, providing it is possible to receive a reflected wave from ground roughnesses extending perpendicularly to the reflected wave.

The frequency spectrum of the first filtered signal therefore depends strongly on the angle α.

For that angle to be well defined, it is necessary for the radar beam to be very narrow, so that known methods of the kind in question operate poorly when the body is moving over relatively smooth ground, as applies for example to a road surface, particularly in the event of rain or ice.

Because the radar beam is narrow, there is then low probability of the beam encountering a reflecting obstacle capable of returning a reflected wave to the transmitter/receiver to enable the speed of the moving body to be measured.

In addition, if the beam is highly directional, then it is necessary to use a transmit-and-receive antenna that is directional, which antenna must therefore have lateral dimensions that are large relative to the wavelength used, and that constitutes a handicap both in terms of cost and in terms of ease of implementation.

Also, known methods of the kind in question generate measurement errors when the above-mentioned α varies unintentionally, e.g. when the moving body is a vehicle that is tilted forwards or backwards to a greater or lesser extent depending on its loading.

Also, document FR-A-2 443 070 describes a method of measuring the speed of an airplane relative to the ground by transmitting two radar waves in turn to the ground at different varying frequencies. That method, which does not involve determining the frequency spectrum of the low frequency component of the multiplied signal, makes use of an iterative technique enabling two particular angles of incidence $\alpha 1$ and $\alpha 2$ to be determined which correspond respectively to the minimum beat frequency values of the two radar waves, where the beat frequency is the frequency of the low frequency component of the above-mentioned multiplied signal. That method is therefore effective only so long as there exists a reflected radar wave for the above-mentioned particular angles of incidence $\alpha 1$ and $\alpha 2$: it therefore suffers from the same drawbacks as the above-mentioned method which uses a narrow radar beam.

OBJECT AND BRIEF SUMMARY OF THE INVENTION

A particular aim of the present invention is to remedy those drawbacks.

To this end, according to the invention, in a method of the kind in question including frequency spectrum determination the transmitted radar beam is relatively broad, the first frequency $f_1$ is time-varying, and said method further includes the following steps:

f) measuring the height h of the radar transmitter/receiver above the ground;

g) at a second instant $t_2$ very close to the first instant $t_1$, supplying the transmitter/receiver with a second sinusoidal control electrical signal having a second frequency $f_2$ to cause the transmitter/receiver to transmit a second incident radar wave at that same frequency $f_2$;

h) receiving a second reflected radar wave generated by reflection of the second incident radar wave on the ground, and generating a second received electrical signal from said second reflected radar wave;

i) multiplying together the second control electrical signal and the second received electrical signal, thereby generating a second multiplied electrical signal having a high frequency component and a low frequency component;

j) filtering the second multiplied electrical signal to generate a second filtered signal proportional to the low frequency component of the second multiplied signal;

k) during a second measurement time $\Delta t_2$ starting from the second instant $t_2$, determining a second frequency spectrum corresponding to the second filtered signal;

l) identifying a first singular point in the first spectrum and a second singular point in the second spectrum such that the first and second spectra in the vicinity of said two singular points are similar in form but with a certain frequency shift, said two singular points being generated by reflection from the same point on the ground;

m) measuring, in the first and second spectra, first and second frequencies $F_1$, $F_2$ corresponding respectively to the first and second singular points; and n) computing the speed v of the moving body relative to the ground on the basis of the height h of the radar transmitter/receiver above the ground and of the first and second frequencies $F_1$, $F_2$ corresponding to the two singular points.

Thus, because a broad radar beam is used, there is a high chance that each transmitted radar wave will encounter a reflecting obstacle on the ground and will therefore be accompanied by a reflection back to the radar transmitter receiver such that there always exist at least a portion of the first and second frequency spectra usable for computing the speed of the moving body by the Doppler effect.

Also, variations in the angle a can be ignored since the two Doppler measurements performed make it possible to compute simultaneously both the angle $\alpha$ and the speed v: in other words, it is possible to provide an expression for the speed v that is independent of the angle $\alpha$.

In preferred implementations of the method of the invention, use is also made of one or more of the following dispositions:

the first and second frequencies $f_1$, $f_2$ are linear functions of time, at least during the first and second measurement times $\Delta t_1$, $\Delta t_2$; and step n) consists in solving the following system of two equations in two unknowns $\alpha$ and v:

$$F_1 = \left| f_1' \cdot \frac{2h}{c \cdot \sin\alpha} - \frac{2v \cdot \cos\alpha}{c} f_1(t_1 + \Delta t_1/2) \right| \quad \text{VII)}$$

$$F_2 = \left| f_2' \cdot \frac{2h}{c \cdot \sin\alpha} - \frac{2v \cdot \cos\alpha}{c} f_2(t_2 + \Delta t_2/2) \right| \quad \text{VIII)}$$

where:
the symbols || on either side of an expression designate the absolute value of the expression, here and throughout the present text;

c is the propagation speed of the radar wave in air;

$\alpha$ is the angle between the direction in which the body is moving and a direction extending between the transmitter/receiver and the point on the ground that has generated the first and second singular points;

$f_1(t_1+\Delta t_1/2)$ designates the value of the first frequency $f_1$ at instant $t_1+\Delta t_1/2$;

$f_1'$ designates the value of the time derivative of the first frequency $f_1$ during the first measurement time $\Delta t_1$;

$f_2(t_2+\Delta t_2/2)$ designates the value of the second frequency $f_2$ at instant $t_2+\Delta t_2/2$; and $f_2'$ designates the value of the time derivative of the second frequency $f_2$ during the second measurement time $\Delta t_2$;

the second frequency $f_2$ is constant, and the first frequency $f_1$ at instant $t_1+\Delta t_1/2$ presents a value $f_1(t_1+\Delta t_1/2)$ close to that of the second frequency $f_2$, the speed v of the moving body relative to the ground then being computed from the formula:

$$v = \frac{cF_2}{2f_2 \sqrt{1 - \{[2f_1' \cdot h]/[c(F_1 - F_2)]\}^2}} \quad \text{XIV)}$$

thus enabling the speed to be determined particularly simply;

the radar beam includes a transmission direction that is substantially perpendicular to the ground such that the first spectrum includes a characteristic peak $P_1(\pi/2)$ corresponding to said direction substantially perpendicular to the ground, the method including a step that consists in measuring a frequency $F_1(\pi/2)$ corresponding to said characteristic peak in the first spectrum followed by a step consisting in computing the height h of the radar transmitter/receiver relative to the ground from the formula:

$$h = \frac{F_1(\pi/2) \cdot c}{2f_1'} \quad \text{XV)}$$

thus avoiding any need for an additional sensor to measure the height h;

steps e) and k) include a step of digitizing the first and second filtered signals, thus enabling the spectrum to be determined in particularly simple manner;

the first and second spectra are determined by the fast Fourier transform on the basis of the digitized first and second filtered signals;

steps l) and m) are performed for a plurality of pairs of first and second singular points so as to obtain a plurality of pairs of first and second frequencies $F_1$, $F_2$ corresponding respectively to said pairs of singular points in the first and second spectra, the speed v of the moving body then being computed as a function of the height h of the radar transmitter/receiver above the ground and of the various pairs of first and second frequencies $F_1$, $F_2$ corresponding to the singular points;

step f) consists in computing the height h simultaneously as the speed v from the various pairs of first and second frequencies $F_1$, $F_2$ corresponding to the singular points; and the moving body is a vehicle running on the ground.

The invention also provides apparatus for implementing a method as defined above, the apparatus comprising:

a radar wave transmitter/receiver, said transmitter/receiver having an input for receiving a sinusoidal control electrical signal at a certain frequency $f_1$, $f_2$ to generate an incident radar wave of the same frequency by forming a radar beam directed towards the ground, going forwards or backwards relative to the direction of movement, said transmitter/receiver further including an output for generating a received electrical signal from a reflected radar wave received by the transmitter/receiver;

an oscillator including an output connected to the input of the transmitter/receiver and designed to generate the control electrical signal;

a mixer circuit having two inputs and an output, the two inputs of the mixer being connected respectively to the output of the transmitter/receiver and to the oscillator to receive respectively the control electrical signal and the received electrical signal, the mixer circuit generating at its output a "multiplied" electrical signal corresponding to the product of the received electrical signal multiplied by the control electrical signal, said multiplied signal having a high frequency component and a low frequency component;

a lowpass filter having an input and an output, the input of the lowpass filter being connected to the output of the mixer to receive the multiplied signal, and the lowpass filter being designed to generate a filtered signal at its output representative of the low frequency component of the multiplied signal; and a central unit including a first input connected to the output of the lowpass filter to receive the filtered signal, said central unit being designed to determine a frequency spectrum of the filtered signal in order to compute the speed v of the moving body from the filtered signal;

the apparatus being wherein the beam of the incident radar wave is relatively broad, the oscillator further including a control input designed to receive a control voltage, the oscillator being designed so that the frequency of the control electrical signal is a function of the control voltage, the control input of the oscillator being connected to a voltage generator itself driven by the central unit, the central unit further including means for determining the height h of the transmitter/receiver relative to the ground, and the central unit being designed:

to cause the voltage generator to generate in alternation a first control voltage and a second control voltage so as to cause the oscillator to generate in alternation first and second control electrical signals having respective first and second frequencies $f_1$, $f_2$ respectively proportional to the first and second control voltages, at least the first control voltage being time-varying, so that at least the first frequency $f_1$ is time-varying;

during a first measurement time $\Delta t_1$ starting from a first instant $t_1$, to determine a first frequency spectrum of the filtered signal while the oscillator generates the first control electrical signal, and during a second measurement time $\Delta t_2$ starting from a second instant $t_2$ very close to the first instant $t_1$, to determine a second frequency spectrum of said filtered signal at a second instant $t_2$ very close to the first instant $t_1$, during which the oscillator generates the second control electrical signal;

to identify a first singular point in the first spectrum and a second singular point in the second spectrum such that the first and second spectra have forms that are similar in the vicinity of said two singular points but with a certain frequency shift, said two singular points being generated by reflection from the same point of the ground;

to measure first and second frequencies $F_1$, $F_2$ corresponding respectively to the first and second singular points in the first and second spectra; and to compute the speed v of the moving body relative to the ground on the basis of the height h of the radar transmitter/receiver above the ground and of the first and second frequencies $F_1$, $F_2$ corresponding to the two singular points.

In preferred embodiments of the apparatus of the invention, use is also made of one or more of the following dispositions:

the first and second frequencies $f_1$, $f_2$ are linear functions of time, at least during the first and second measurement times $\Delta t_1$, $\Delta t_2$, and the central unit is designed to solve the following system of two equations in two unknowns α and v:

$$F_1 = \left| f_1' \cdot \frac{2h}{c \cdot \sin\alpha} - \frac{2v \cdot \cos\alpha}{c} f_1(t_1 + \Delta t_1/2) \right| \quad \text{VII)}$$

$$F_2 = \left| f_2' \cdot \frac{2h}{c \cdot \sin\alpha} - \frac{2v \cdot \cos\alpha}{c} f_2(t_2 + \Delta t_2/2) \right| \quad \text{VIII)}$$

where:

c is the propagation speed of the radar wave in air;

α is the angle between the direction in which the body is moving and a direction extending between the transmitter/receiver and the point on the ground that has generated the first and second singular points;

$f_1(t_1+\Delta t_1/2)$ designates the value of the first frequency $f_1$ at instant $t_1+\Delta t_1/2$;

$f_1'$ designates the value of the time derivative of the first frequency $f_1$ during the first measurement time $\Delta t_1$;

$f_2(t_2+\Delta t_2/2)$ designates the value of the second frequency $f_2$ at instant $t_2+\Delta t_2/2$; and $f_2'$ designates the value of the time derivative of the second frequency $f_2$ during the second measurement time $\Delta t_2$;

the central unit includes a second input connected to a height sensor to receive a signal representative of the height h of the transmitter/receiver relative to the ground, said second input constituting the above-mentioned means of the central unit for determining the height h of the transmitter/receiver relative to the ground;

the beam of the incident radar wave includes a transmission direction that is substantially perpendicular to the ground, such that the first spectrum includes a peak characteristic of said direction that is substantially perpendicular to the ground, the means for determining the height h of the transmitter/receiver relative to the ground comprising means for measuring a frequency $F_1(\pi/2)$ corresponding to said characteristic peak and means for computing said height h from said frequency $F_1(\pi/2)$; and the control unit is designed to digitize the filtered signal it receives at its first input prior to determining the frequency spectrum of said filtered signal.

BRIEF DESCRIPTION OF THE DRAWING

Other characteristics and advantages of the invention appear from the following detailed description of an embodiment thereof, given by way of non-limiting example and with reference to the accompanying drawing.

In the drawing.

MORE DETAILED DESCRIPTION

Figure 1:
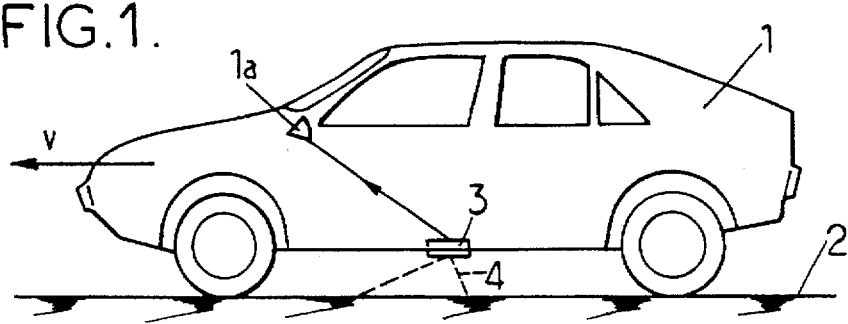
FIG. 1 is a diagrammatic overall view of a vehicle fitted with speed-measuring radar constituting an embodiment of the invention.

As shown diagrammatically in FIG. 1, the invention seeks to determine the speed v of a moving body 1, in particular a motor vehicle running on ground 2, with the measurement being performed by means of a Doppler effect radar 3 which transmits an incident radar beam 4 towards the ground in a forwards or backwards direction, the incident beam being relatively broad, e.g. having a divergence angle of about 45°.

The speed as measured by the radar 3 can be applied to a display device 1a on the vehicle dashboard, or to any other member of the vehicle, e.g. an anti-lock braking system for the wheels.

Figure 2:
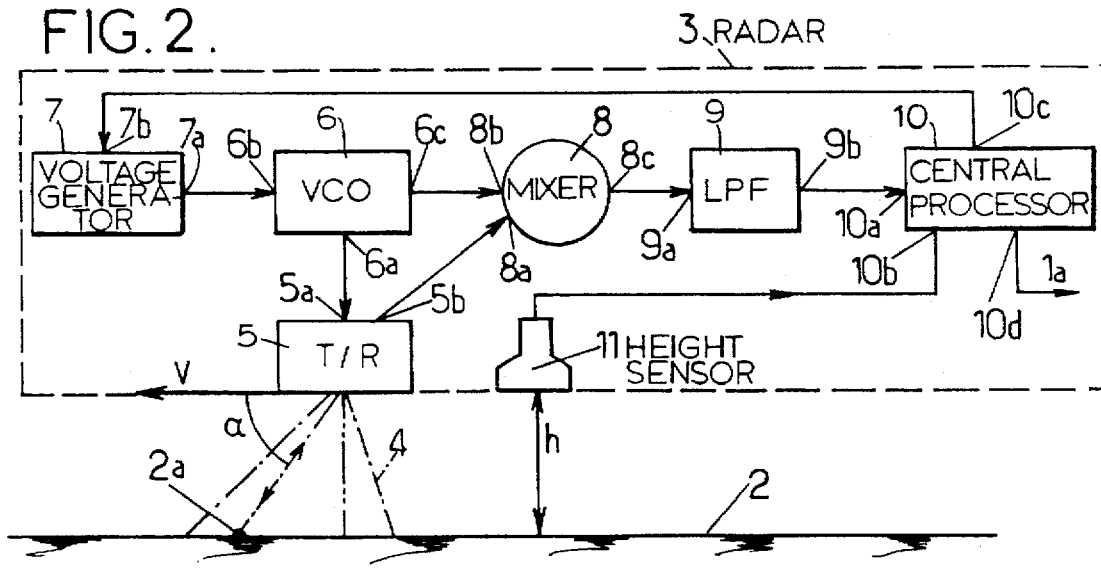
FIG. 2 is a block diagram of the radar of the FIG. 1 vehicle.

As shown diagrammatically in FIG. 2, the radar 3 may comprise:
- a radar wave transmitter/receiver 5 having an input 5a for receiving a sinusoidal control electrical signal so as to generate an incident radar wave at the same frequency as the signal to constitute the incident radar beam 4, said transmitter/receiver also including an output 5b for generating a received electrical signal on reception of a radar wave reflected by the ground 2 from the incident wave;
- a voltage-controlled oscillator 6 having an output 6a connected to the input 5a of the transmitter/receiver and an input 6b for receiving a control voltage, the output 6a being designed to generate said control electrical signal at a frequency $f_1$, $f_2$ depending on the control voltage;
- a voltage generator 7 having an output 7a for generating said control voltage and a logic input 7b for driving the control voltage;
- a mixer circuit 8 having two inputs 8a and 8b and an output 8c, the input 8a of the mixer being connected to the output 5b of the transmitter/receiver and the input 8b of the mixer being connected to the output 6a of the oscillator or possibly to an additional output 6c of said oscillator at which an electrical signal is generated that is proportional to the control electrical signal but of lower power, the mixer circuit 8 being deigned to generate a "multiplied" electrical signal at its output 8c and corresponding to the product of the received electrical signal multiplied by the control electrical signal, said multiplied signal having a high frequency component and a low frequency component;
- a lowpass filter 9 having an input 9a which is connected to the output 8c of the mixer, and an output 9b at which a filtered signal is generated representative of the low frequency component of the multiplied signal; and
- a central unit 10 having a first input 10a connected to the output 9b of the lowpass filter to receive the filtered signal, a second input 10b connected to a height sensor 11, e.g. an ultrasound or other sensor for the purpose of receiving a signal representative of the height h of the transmitter/receiver 5 relative to the ground 2, said height h being measured perpendicularly to the ground, and the central unit further including a first output 10c connected to the logic input 7b of the voltage generator 7 to drive said voltage generator, and a second output 10d connected to the display 1a or to some other member.

Figure 3:
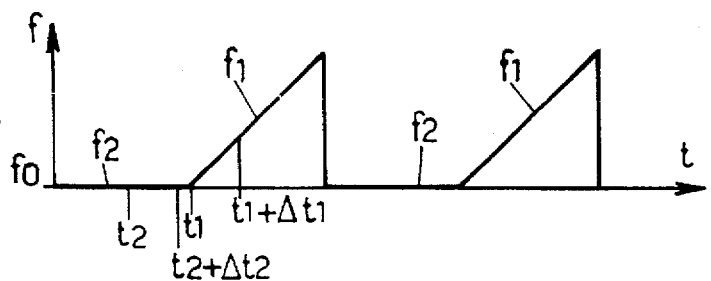
FIG. 3 is a spectrum diagram showing one example of frequency variation in the wave transmitted by the radar of FIG. 2.
Figure 4:
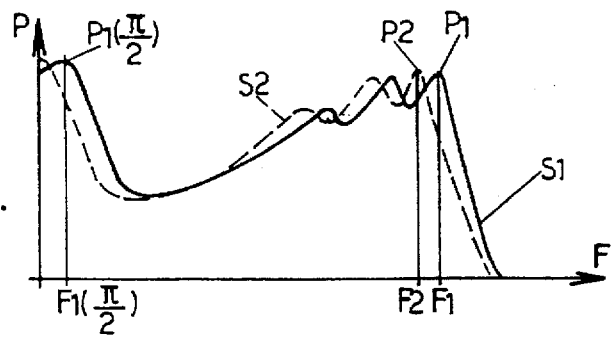
FIG. 4 shows two frequency spectra of a signal output by the lowpass filter 9 of FIG. 2, determined at two different instants that are very close together.

The central unit 10 is programmed:
- to cause the voltage generator 7 to generate in alternation a first control voltage that is time-varying and a second control voltage that is constant or varying, so as to cause the oscillator to generate in alternation first and second control electrical signals $Ec_1$ and $Ec_2$ having the first and second frequencies $f_1$ and $f_2$ respectively, which frequencies are respectively proportional to the first and second control voltages (for example, $f_1$ may be constituted by a portion of a ramp that increases linearly from a constant frequency $f_0$ and then falls back to $f_0$, while $f_2$ may be constituted by the constant frequency $f_0$, as shown in FIG. 3);
- to determine a first frequency spectrum $S_1$ of the filtered signal during a first measurement time $\Delta t_1$ starting from a first instant $t_1$ during which the oscillator generates the first control electrical signal $Ec_1$, and to determine a second frequency spectrum $S_2$ of the filtered signal during a second measurement time $\Delta t_2$ starting from a second instant $t_2$ very close to the first instant $t_1$ (before or after the first instant $t_1$), during which the oscillator generates the second control electrical signal $Ec_2$ (see FIG. 4);
- to identify a first peak $P_1$ in the first spectrum $S_1$, and a second peak $P_2$ in the second spectrum $S_2$, such that the first and second spectra are similar in form in the vicinity of said two peaks but with a certain frequency shift, said two peaks then being generated by a reflection from the same reflecting point 2a on the ground, said point generally corresponding to an irregularity of the ground;
- to measure the first and second frequencies $F_1$ and $F_2$ corresponding respectively to the first and second peaks $P_1$ and $P_2$ in the first and second spectra $S_1$ and $S_2$; and
- to compute the speed v of the moving body relative to the ground on the basis of the height h of the radar transmitter/reciever above the ground, and on the basis of the measured first and second frequencies $F_1$ and $F_2$, the computation being performed as explained below.

In the vicinity of the first instant $t_1$, the first control electrical signal $Ec_1$ can be expressed in the form:

$$Ec_1 = A_1 \sin(2\pi f_1(t_1) \cdot t) \tag{I}$$

where:

t represents time;

$A_1$ is a constant; and $f_1(t_1)$ represents the value of the first frequency $f_1$ at the first instant $t_1$.

Under such conditions, the first received electrical signal $Er_1$ corresponding to the first peak $P_1$ is expressed as follows, in application of the well-known Doppler shift formula:

$$Er_1 = A_2 \sin\left[2\pi f_1(t_1) \cdot \left[1 + \frac{2v \cdot \cos\alpha}{c}\right] \cdot t\right] \tag{II}$$

where:

$A_2$ is a constant;

α represents the angle between the displacement direction of the body and the direction to the point 2a on the ground seen from the transmitter/receiver 5 (α lying in the range 0 to π/2 radians if the radar beam is directed forwards, and lying in the range π/2 and π if the beam is directed backwards); and c represents the propagation speed of the radar wave in air.

The first received electrical signal $Er_1$ is generated at the output 5b of the transmitter/reciever 5 at an instant $t_1$+dt, where dt corresponds to the go-and-return time for the electromagnetic wave between the transmitter/receiver and the point 2a on the ground.

Consequently, the mixer circuit 8 generates a "multiplied" signal which is the product of the first received electrical signal corresponding to above formula (II) multiplied by the first control electrical signal, but with said first control electrical signal then having a frequency $f_1(t_1+dt)$, since said multiplication is performed at instant $t_1+dt$.

The "multiplied" signal generated at the output from the mixer corresponds to the sum of two terms $C_1$ and $D_1$ given below in application of conventional trigonometrical formulae:

$$C_1 = -\frac{A_1 A_2}{2} \cos\left\{ 2\pi \left[ f_1(t_1+dt) + f_1(t_1)\left(1 + \frac{2v \cdot \cos\alpha}{c}\right) \right] \cdot t \right\} \quad \text{III)}$$

$$D_1 = \frac{A_1 A_2}{2} \cos\left\{ 2\pi \left[ f_1(t_1+dt) - f_1(t_1)\left(1 + \frac{2v \cdot \cos\alpha}{c}\right) \right] \cdot t \right\}$$

The term $C_1$ is a high frequency signal while the term $D_1$ is a low frequency signal.

Only the low frequency signal $D_1$ passes through the lowpass filter 9 to the first input 10a of the central unit 10. This low frequency signal presents a frequency $F_1$ corresponding to a peak $P_1$ in the first spectrum $S_1$, i.e. corresponding to the reflection of the radar wave on the reflecting point 2a.

If the first measurement time $\Delta t_1$ were nil, then this frequency would be expressed in the following form:

$$F_1 = \left| f_1(t_1+dt) - f_1(t_1)\left[1 + \frac{2v \cdot \cos\alpha}{c}\right] \right| \quad \text{IV)}$$

$$= \left| f_1(t_1+dt) - f_1(t_1) - \frac{2v \cdot \cos\alpha}{c} f_1(t_1) \right|$$

where:

|| designates the absolute value function.

$f_1$ is preferably a linear function of time, at least during the first measurement time $\Delta t_1$, such that:

$$f_1(t_1+dt) - f_1(t_1) = f1' \cdot dt$$

where f1' is the value of the time derivative of the first frequency $f_1$ during the first measurement time $\Delta t_1$.

Also, account must be taken of the fact that the first measurement time $\Delta t_1$ is not nil, such that to a first approximation expression (IV) can be written:

$$F_1 = \left| f_1' \cdot dt - \frac{2v \cdot \cos\alpha}{c} f_1(t_1 + \Delta t_1/2) \right| \quad \text{V)}$$

Also, the time interval dt can be written in the form:

$$dt = \frac{2h}{c \cdot \sin\alpha} \quad \text{VI)}$$

whence $$F_1 = \left| f_1' \cdot \frac{2h}{c \cdot \sin\alpha} - \frac{2v \cdot \cos\alpha}{c} f_1(t_1 + \Delta t_1/2) \right| \quad \text{VII)}$$

Also, the incident radar wave corresponding to the second control electrical signal $Ec_2$ likewise generates a large reflection on point 2a of the ground, and because the second instant $t_2$ is very close to the first instant $t_1$, the angle $\alpha$ between the travel direction of the vehicle and the direction at which the point 2a is seen from the transmitter/receiver 5 is substantially the same at both instants $t_1$ and $t_2$.

Under such conditions, and in the same manner as explained above, the second spectrum $S_2$ includes a peak $P_2$ which corresponds to the radar wave being reflected on the point 2a, said peak $P_2$ corresponding to a frequency $F_2$ that is expressed as follows:

$$F_2 = \left| f_2' \cdot \frac{2h}{c \cdot \sin\alpha} - \frac{2v \cdot \cos\alpha}{c} f_2(t_2 + \Delta t_2/2) \right| \quad \text{VIII)}$$

where $f_2(t_2+\Delta t_2/2)$ is the value of the second frequency $f_2$ at the instant $t_2+\Delta t_2/2$;

$f_2'$ is the value of the time derivative of the second frequency $f_2$ during the second measurement time $\Delta t_2$.

Thus, the central unit 10 can determine the speed v of the vehicle by solving the system of two equations (VII) and (VIII) in two unknowns $\alpha$ and v, the other parameters of these two equations all being known to the central unit 10.

The system of equations (VII) and (VIII) can thus be written:

$$F_1 = \frac{a_1}{\sin\alpha} + b_1 v \cdot \cos\alpha \quad \text{IX)}$$

$$F_2 = \frac{a_2}{\sin\alpha} + b_2 v \cdot \cos\alpha$$

where:

$a_1$, $b_1$, $a_2$, and $b_2$ are known parameters, said system of equations reducing to:

$$\sin\alpha = \frac{a_1 b_2 - a_2 b_1}{b_2 F_1 - b_1 F_2} \quad \text{X)}$$

$$v = \frac{F_2 - a_2/\sin\alpha}{b_2 \sqrt{1 - \sin^2\alpha}} \text{ (in absolute value)}$$

given that $\cos^2 \alpha + \sin^2 \alpha 1$.

The second frequency $f_2$ may possibly be constant, as shown in FIG. 3, in which case the frequency $F_2$ of the second peak $P_2$ corresponds to the following expression:

$$F_2 = \left| -\frac{2v \cdot \cos\alpha}{c} f_2 \right| \quad \text{XI)}$$

If the values $f_1(t_1+\Delta t_1/2)$ and $f_2$ are very close, as shown in FIG. 3, it is then possible from formulae (XI) and (VII) and also taking account of the fact that the expression giving the absolute value of $F_1$ has the same sign as its term in $(2v.\cos \alpha)/c$ for usual values of h, v, and $\alpha$:

$$|F_1 - F_2| = \left| f_1' \cdot \frac{2h}{c \cdot \sin\alpha} \right| \quad \text{XII)}$$

from which it results that $$\sin\alpha = \left| \frac{2f_1' \cdot h}{c(F_1 - F_2)} \right| \quad \text{XIII)}$$

$$v = \frac{cF_2}{2f_1 \sqrt{1 - \sin^2\alpha}}$$

The value of the speed v thus corresponds to the following expression:

$$v = \frac{cF_2}{2f_2 \sqrt{1 - \{[2f_1' \cdot h]/[c(F_1 - F_2)]\}^2}} \quad \text{XIV)}$$

In a special case where $f_1$ and $f_2$ are such as shown in FIG. 3, where $f_1$ is a linear function of time having a slope of 1 GHz/s, where $f_2$ has a constant value $f_2$, e.g. equal to 24 GHz, where $f_2(t_2)=f_1(t_1)$, the second frequency $F_2$ of the second peak $P_2$ will be 2376 Hz for an angle $\alpha$ equal to 30°, and the difference between the frequencies $F_1$ and $F_2$ will be equal to 46 Hz for a height h equal to 0.5 meters (m).

Because of the small values of the frequencies $F_1$ and $F_2$, the first and second spectra $S_1$ and $S_2$ can be obtained very easily, e.g. by the fast Fourier transform after digitizing the filtered signal supplied to the first input 10a of the central unit 10.

Optionally, it is possible to avoid using a height sensor 11 by providing for the beam 4 of the incident radar wave, or for a portion of said beam, to include a direction 4a that is perpendicular to the ground 2 so that the first frequency spectrum $S_1$ presents a relatively large characteristic peak $P_1(\pi/2)$ corresponding to a very low frequency $F_1(\pi/2)$.

This peak corresponds to the angle a having a value equal to $\pi/2$, such that from above equation (VII) it is possible to compute the height h of the transmitter/receiver 5 above the ground 2 from the formula:

$$h = \frac{F_1(\pi/2) \cdot c}{2f_1'} \qquad \text{XV)}$$

The invention is not limited to the particular embodiment described above; on the contrary it extends to all variants, and in particular:

- those in which the two spectra $S_1$ and $S_2$ are determined simultaneously, the radar transmitting and receiving simultaneously at two different frequencies $f_1$ and $f_2$ and including filters enabling the respective signals relating to each of the two frequencies $f_1$ and $f_2$ to be separated;
- those in which the speed v is determined not solely from one pair of frequencies $F_1$ and $F_2$ corresponding to one pair of peaks $P_1$ and $P_2$ in the first and second spectra, but from a plurality of pairs of frequencies $F_1$, $F_2$ corresponding to a plurality of pairs of peaks in the two spectra, the computed value of the speed v then possibly being the average of the various speed values v computed from each pair of frequencies $F_1$, $F_2$; under such circumstances, it is also possible to determine the height h simultaneously as the speed v on the basis of different frequency pairs $F_1$, $F_2$, by solving the system of equations that corresponds to the various equations (VII) and (VIII) relating to the various frequencies $F_1$, $F_2$: in other words it is possible to compute an expression for the speed v that is independent of the height h; and
- those in which the frequencies $F_1$, $F_2$ used for computing the speed v correspond more generally to singular points in the spectra $S_1$, $S_2$, i.e. not only to peaks, but also possibly to minima, or to any other characteristic points.

To limit spectrum occupancy, the sawtooth frequency modulation shown in FIG. 3 may advantageously have sawteeth that are substantially symmetrical, i.e. with non-vertical rising and falling slopes.

To facilitate modulation of the radar frequency, the modulation may be sinusoidal, with the spectra being measured in the substantially linear portions of the sinusoidal frequency variation curves (i.e. in the vicinity of the points of inflection in said sinusoidal curves).

We claim:

1. A method of measuring the speed v of a body moving in a direction parallel to the ground, said measurement being performed by means of a Doppler radar having a transmitter/receiver fixed to the moving body at a certain height h above the ground and designed to transmit a radar beam towards the ground along a mean axis extending forwards or backwards relative to the direction of movement, said method including the following steps:

a) at a first instant $t_1$, supplying the radar transmitter/receiver with a first sinusoidal control electrical signal at a first frequency $f_1$ to cause the transmitter/receiver to transmit a first incident radar wave at the same frequency $f_1$;

b) receiving a first reflected radar wave generated by the first incident radar wave being reflected on the ground, and generating from said first reflected radar wave a first received electrical signal;

c) multiplying together the first control electrical signal and the first received electrical signal, thereby generating a first multiplied electrical signal having a high frequency component and a low frequency component;

d) filtering the first multiplied electrical signal to generate a first filtered signal proportional to the low frequency component of the first multiplied signal; and e) during a first measurement time $\Delta t_1$ starting at the first instant $t_1$, determining a first frequency spectrum corresponding to the first filtered signal;

wherein the transmitted radar beam is relatively broad, wherein the first frequency $f_1$ is time-varying, and wherein said method further includes the following steps:

f) measuring the height h of the radar transmitter/receiver above the ground;

g) at a second instant $t_2$ very close to the first instant $t_1$, supplying the transmitter/receiver with a second sinusoidal control electrical signal having a second frequency $f_2$ to cause the transmitter/receiver to transmit a second incident radar wave at that same frequency $f_2$;

h) receiving a second reflected radar wave generated by reflection of the second incident radar wave on the ground, and generating a second received electrical signal from said second reflected radar wave;

i) multiplying together the second control electrical signal and the second received electrical signal, thereby generating a second multiplied electrical signal having a high frequency component and a low frequency component;

j) filtering the second multiplied electrical signal to generate a second filtered signal proportional to the low frequency component of the second multiplied signal;

k) during a second measurement time $\Delta t_2$ starting from the second instant $t_2$, determining a second frequency spectrum corresponding to the second filtered signal;

l) identifying a first singular point in the first spectrum and a second singular point in the second spectrum such that the first and second spectra in the vicinity of said two singular points are similar in form but with a certain frequency shift, said two singular points being generated by reflection from the same point on the ground;

m) measuring in the first and second spectra first and second frequencies $F_1$, $F_2$ corresponding respectively to the first and second singular points; and n) computing the speed v of the moving body relative to the ground on the basis of the height h of the radar transmitter/receiver above the ground and of the first and second frequencies $F_1$, $F_2$ corresponding to the two singular points.

2. A method according to claim 1, in which:

the first and second frequencies $f_1$, $f_2$ are linear functions of time, at least during the first and second measurement times $\Delta t_1$, $\Delta t_2$; and step n) consists in solving the following system of two equations in two unknowns $\alpha$ and v:

$$F_1 = \left| f_1' \cdot \frac{2h}{c \cdot \sin\alpha} - \frac{2v \cdot \cos\alpha}{c} f_1(t_1 + \Delta t_1/2) \right| \quad \text{VII)}$$

$$F_2 = \left| f_2' \cdot \frac{2h}{c \cdot \sin\alpha} - \frac{2v \cdot \cos\alpha}{c} f_2(t_2 + \Delta t_2/2) \right| \quad \text{VIII)}$$

where:

c is the propagation speed of the radar wave in air;

$\alpha$ is the angle between the direction in which the body is moving and a direction extending between the transmitter/receiver and the point on the ground that has generated the first and second singular points;

$f_1(t_1+\Delta t_1/2)$ designates the value of the first frequency $f_1$ at instant $t_1+\Delta t_1/2$;

$f_1'$ designates the value of the time derivative of the first frequency $f_1$ during the first measurement time $\Delta t_1$;

$f_2(t_2+\Delta t_2/2)$ designates the value of the second frequency $f_2$ at instant $t_2+\Delta t_2/2$; and $f_2'$ designates the value of the time derivative of the second frequency $f_2$ during the second measurement time $\Delta t_2$.

3. A method according to claim 2, in which the second frequency $f_2$ is constant, and the first frequency $f_1$ at instant $t_1+\Delta t_1/2$ presents a value $f_1(t_1+\Delta t_1/2)$ close to that of the second frequency $f_2$, the speed v of the moving body relative to the ground then being computed from the formula:

$$v = \frac{cF_2}{2f_2\sqrt{1-\{[2f_1' \cdot h]/[c(F_1-F_2)]\}^2}} \quad \text{XIV)}$$

4. A method according to claim 2, in which the radar beam includes a transmission direction that is substantially perpendicular to the ground such that the first spectrum includes a characteristic peak $P_1(\pi/2)$ corresponding to said direction substantially perpendicular to the ground, step f) of the method including a step that consists in measuring a frequency $F_1(\pi/2)$ corresponding to said characteristic peak in the first spectrum followed by a step consisting in computing the height h of the radar transmitter/receiver relative to the ground from the formula:

$$h = \frac{F_1(\pi/2) \cdot c}{2f_1'} \quad \text{XV)}$$

5. A method according to claim 1, in which steps e) and k) include a step of digitizing the first and second filtered signals.

6. A method according to claim 5, in which the first and second spectra are determined by the fast Fourier transform on the basis of the digitized first and second filtered signals.

7. A method according to claim 1, in which steps l) and m) are performed for a plurality of pairs of first and second singular points so as to obtain a plurality of pairs of first and second frequencies $F_1$, $F_2$ corresponding respectively to said pairs of singular points in the first and second spectra, the speed v of the moving body then being computed as a function of the height h of the radar transmitter/receiver above the ground and of the various pairs of first and second frequencies $F_1$, $F_2$ corresponding to the singular points.

8. A method according to claim 7, in which step f) consists in computing the height h simultaneously as the speed v from the various pairs of first and second frequencies $F_1$, $F_2$ corresponding to the singular points.

9. A method according to claim 1, in which the moving body is a vehicle running on the ground.

10. Apparatus for implementing a method according to claim 1 in order to measure the speed v of a body moving in a direction parallel to the ground, said apparatus comprising:

a radar wave transmitter/receiver, said transmitter/receiver having an input for receiving a sinusoidal control electrical signal at a certain frequency $f_1$, $f_2$ to generate an incident radar wave of the same frequency by forming a radar beam directed towards the ground, going forwards or backwards relative to the direction of movement, said transmitter/receiver further including an output for generating a received electrical signal from a reflected radar wave received by the transmitter/receiver;

an oscillator including an output connected to the input of the transmitter/receiver and designed to generate the control electrical signal;

a mixer circuit having two inputs and an output, the two inputs of the mixer being connected respectively to the output of the transmitter/receiver and to the oscillator to receive respectively the control electrical signal and the received electrical signal, the mixer circuit generating at its output a multiplied electrical signal corresponding to the product of the received electrical signal multiplied by the control electrical signal, said multiplied signal having a high frequency component and a low frequency component;

a lowpass filter having an input and an output, the input of the lowpass filter being connected to the output of the mixer to receive the multiplied signal, and the lowpass filter being designed to generate a filtered signal at its output representative of the low frequency component of the multiplied signal; and a central unit including a first input connected to the output of the lowpass filter to receive the filtered signal, said central unit being designed to determine a frequency spectrum of the filtered signal in order to compute the speed v of the moving body from the filtered signal;

wherein the beam of the incident radar wave is relatively broad, the oscillator further including a control input designed to receive a control voltage, the oscillator being designed so that the frequency of the control electrical signal is a function of the control voltage, the control input of the oscillator being connected to a voltage generator itself driven by the central unit, the central unit further including means for determining the height h of the transmitter/receiver relative to the ground, and the central unit being designed:

to cause the voltage generator to generate in alternation a first control voltage and a second control voltage so as to cause the oscillator to generate in alternation first and second control electrical signals having respective first and second frequencies $f_1$, $f_2$ respectively proportional to the first and second control voltages, at least the first control voltage being time-varying, so that at least the first frequency $f_1$ is time-varying;

during a first measurement time $\Delta t_1$ starting from a first instant $t_1$, to determine a first frequency spectrum of the filtered signal while the oscillator generates the first control electrical signal, and during a second measurement time $\Delta t_2$ starting from a second instant $t_2$ very close to the first instant $t_1$, to determine a second frequency spectrum of said filtered signal at a second instant $t_2$ very close to the first instant $t_1$, during which the oscillator generates the second control electrical signal;

to identify a first singular point in the first spectrum and a second singular point in the second spectrum such that the first and second spectra have forms that are similar in the vicinity of said two singular points but with a certain frequency shift, said two singular points being generated by reflection from the same point of the ground;

to measure first and second frequencies $F_1$, $F_2$ corresponding respectively to the first and second singular points in the first and second spectra; and to compute the speed v of the moving body relative to the ground on the basis of the height h of the radar transmitter/receiver above the ground and of the first and second frequencies $F_1$, $F_2$ corresponding to the two singular points.

11. Apparatus according to claim 10, in which:

the first and second frequencies $f_1$, $f_2$ are linear functions of time, at least during the first and second measurement times $\Delta t_1$, $\Delta t_2$; and the central unit is designed to solve the following system of two equations in two unknowns $\alpha$ and v:

$$F_1 = \left| f_1' \cdot \frac{2h}{c \cdot \sin\alpha} - \frac{2v \cdot \cos\alpha}{c} f_1(t_1 + \Delta t_1/2) \right| \quad \text{VII)}$$

$$F_2 = \left| f_2' \cdot \frac{2h}{c \cdot \sin\alpha} - \frac{2v \cdot \cos\alpha}{c} f_2(t_2 + \Delta t_2/2) \right| \quad \text{VIII)}$$

where:

c is the propagation speed of the radar wave in air;

$\alpha$ is the angle between the direction in which the body is moving and a direction extending between the transmitter/receiver and the point on the ground that has generated the first and second singular points;

$f_1(t_1+\Delta t_1/2)$ designates the value of the first frequency $f_1$ at instant $t_1+\Delta t_1/2$;

$f_1'$ designates the value of the time derivative of the first frequency $f_1$ during the first measurement time $\Delta t_1$;

$f_2(t_2+\Delta t_2/2)$ designates the value of the second frequency $f_2$ at instant $t_2+\Delta t_2/2$; and $f_2'$ designates the value of the time derivative of the second frequency $f_2$ during the second measurement time $\Delta t_2$.

12. Apparatus according to claim 10, in which the central unit includes a second input connected to a height sensor to receive a signal representative of the height h of the transmitter/receiver relative to the ground, said second input constituting the above-mentioned means of the central unit for determining the height h of the transmitter/receiver relative to the ground.

13. Apparatus according to claim 10, in which the beam of the incident radar wave includes a transmission direction that is substantially perpendicular to the ground, such that the first spectrum includes a peak characteristic of said direction that is substantially perpendicular to the ground, the means for determining the height h of the transmitter/receiver relative to the ground comprising means for measuring a frequency $F_1(\pi/2)$ corresponding to said characteristic peak and means for computing said height h from said frequency $F_1(\pi/2)$.

14. Apparatus according to claim 10, in which the control unit is designed to digitize the filtered signal it receives at its first input prior to determining the frequency spectrum of said filtered signal.

* * * * *